(12) United States Patent
Chang (10) Patent No.: US 8,424,931 B2
(45) Date of Patent: Apr. 23, 2013

(54) LOCKING APPARATUS FOR LOCKING HARD DISK TO ELECTRONIC DEVICE

(75) Inventor: Chih-Kai Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 198 days.

(21) Appl. No.: 12/625,772

(22) Filed: Nov. 25, 2009

(65) Prior Publication Data

US 2011/0074169 A1    Mar. 31, 2011

(30) Foreign Application Priority Data

Sep. 30, 2009   (CN) .......................... 2009 1 0308051

(51) Int. Cl.
*E05C 1/02*   (2006.01)
*E05C 1/08*   (2006.01)
*E05C 1/12*   (2006.01)

(52) U.S. Cl.
USPC ........................... 292/137; 292/163; 292/164

(58) Field of Classification Search ................ 292/137, 292/163, 164, 173, 175, 143, 180, DIG. 11, 292/DIG. 64, 170, DIG. 31, DIG. 20
See application file for complete search history.

(56) References Cited

U.S. PATENT DOCUMENTS

| | | | | |
|---|---|---|---|---|
| 2,003,205 A | * | 5/1935 | Kuhlemann et al. | 24/603 |
| 2,211,290 A | * | 8/1940 | Raymond | 292/165 |
| 2,649,322 A | * | 8/1953 | Mack | 292/173 |
| 2,764,440 A | * | 9/1956 | Marko | 292/173 |
| 2,874,986 A | * | 2/1959 | Henrichs | 292/167 |
| 2,916,905 A | * | 12/1959 | Podlesak | 70/150 |
| 2,987,908 A | * | 6/1961 | Pelcin | 70/483 |
| 3,081,617 A | * | 3/1963 | McKay | 70/153 |
| 3,090,643 A | * | 5/1963 | Barnes, Sr. | 292/170 |
| 3,449,005 A | * | 6/1969 | Pastva, Jr. | 292/173 |
| 3,494,650 A | * | 2/1970 | Slopa | 292/92 |
| 3,495,862 A | * | 2/1970 | McClintock | 292/173 |
| 3,576,118 A | * | 4/1971 | Doerrfeld | 70/489 |
| 3,668,907 A | * | 6/1972 | Pastva, Jr. | 70/153 |
| 3,671,065 A | * | 6/1972 | Bingham | 292/175 |
| 3,707,862 A | * | 1/1973 | Pastva, Jr. | 70/150 |
| 3,743,336 A | * | 7/1973 | Andrews | 292/173 |
| 3,782,141 A | * | 1/1974 | Doerrfeld | 70/487 |
| 4,060,267 A | * | 11/1977 | Monfardini | 292/173 |
| 4,116,027 A | * | 9/1978 | Tannery | 70/472 |
| 4,138,869 A | * | 2/1979 | Pelcin | 70/151 R |
| 4,231,597 A | * | 11/1980 | Pelcin | 292/164 |
| 4,335,595 A | * | 6/1982 | Swan et al. | 70/149 |
| 4,704,882 A | * | 11/1987 | Takasaki | 70/215 |
| 4,791,756 A | * | 12/1988 | Simpson | 49/175 |
| 4,901,475 A | * | 2/1990 | Simpson | 49/175 |
| 5,413,391 A | * | 5/1995 | Clavin et al. | 292/170 |
| 5,820,175 A | * | 10/1998 | Clavin | 292/165 |

(Continued)

FOREIGN PATENT DOCUMENTS

JP             404038384        *  7/1992

*Primary Examiner* — Thomas Beach
*Assistant Examiner* — Nathan Cumar
(74) *Attorney, Agent, or Firm* — Altis Law Group, Inc.

(57) ABSTRACT

A locking apparatus uses a handle pivotally connected to a base to control the movement of a slide block slidablely accommodated in a base. The slide block includes a locking tongue. The locking tongue protrudes out of the base or retracts back into the base according to the movement of the slide block. Thus, the locking apparatus can lock the hard disk when the locking tongue protrudes out of the base and unlock the hard disk when the locking tongue retracts back into the base.

12 Claims, 6 Drawing Sheets

U.S. PATENT DOCUMENTS

| | | | |
|---|---|---|---|
| 5,820,235 A * | 10/1998 | Tsai | 312/223.2 |
| 6,297,948 B1 * | 10/2001 | Buican et al. | 361/679.58 |
| 6,340,183 B1 * | 1/2002 | Ramsauer | 292/175 |
| 6,427,500 B1 * | 8/2002 | Weinerman et al. | 70/135 |
| 6,513,841 B1 * | 2/2003 | Jackson | 292/214 |
| 6,719,332 B2 * | 4/2004 | Sekulovic | 292/170 |
| 6,722,712 B2 * | 4/2004 | Schultz | 292/175 |
| 7,165,791 B2 * | 1/2007 | Rebel et al. | 292/137 |
| 7,182,374 B2 * | 2/2007 | Figge et al. | 292/334 |
| 7,201,407 B2 * | 4/2007 | Schlack | 292/139 |
| 2006/0255596 A1 * | 11/2006 | Yong | 292/173 |
| 2007/0194578 A1 * | 8/2007 | Boosey et al. | 292/251.5 |
| 2008/0179896 A1 * | 7/2008 | Chung | 292/164 |

* cited by examiner

LOCKING APPARATUS FOR LOCKING HARD DISK TO ELECTRONIC DEVICE

BACKGROUND

1. Technical Field

The present disclosure relates to locking apparatuses and, particularly, to a locking apparatus which can be operated to lock a removable hard disk in place.

2. Description of Related Art

Generally, a hard disk is fastened in an electronic equipment using a number of fasteners. However, when replacing or repairing the hard disk, the fasteners need to be removed, which is inconvenient and time-consuming.

Therefore, it is desirable to provide a locking apparatus for locking a hard disk to an electronic device, which can overcome the above-mentioned problems.

DETAILED DESCRIPTION

Figure 1:
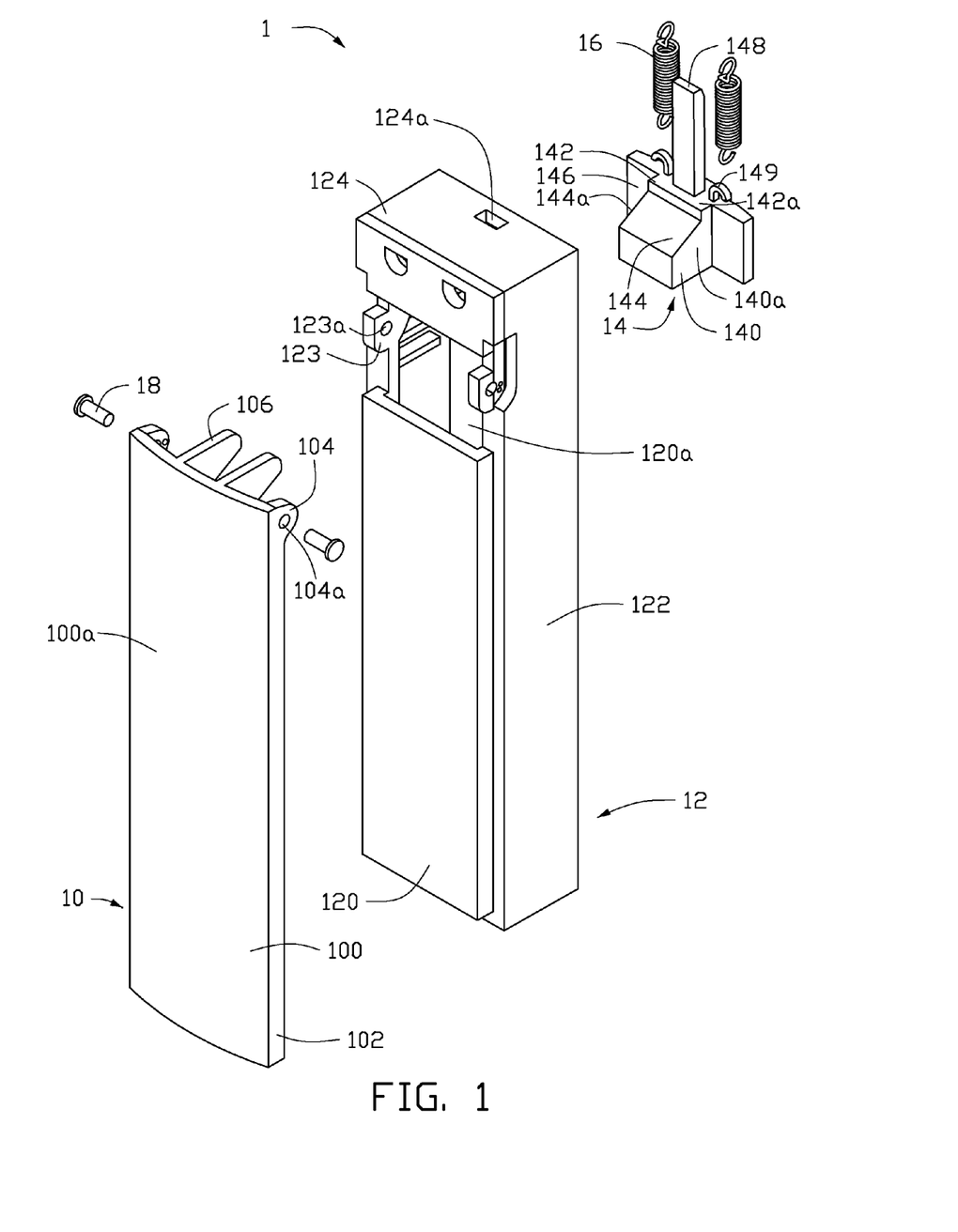
FIG. 1 is an exploded, isometric view of an exemplary embodiment of a locking apparatus.
Figure 2:
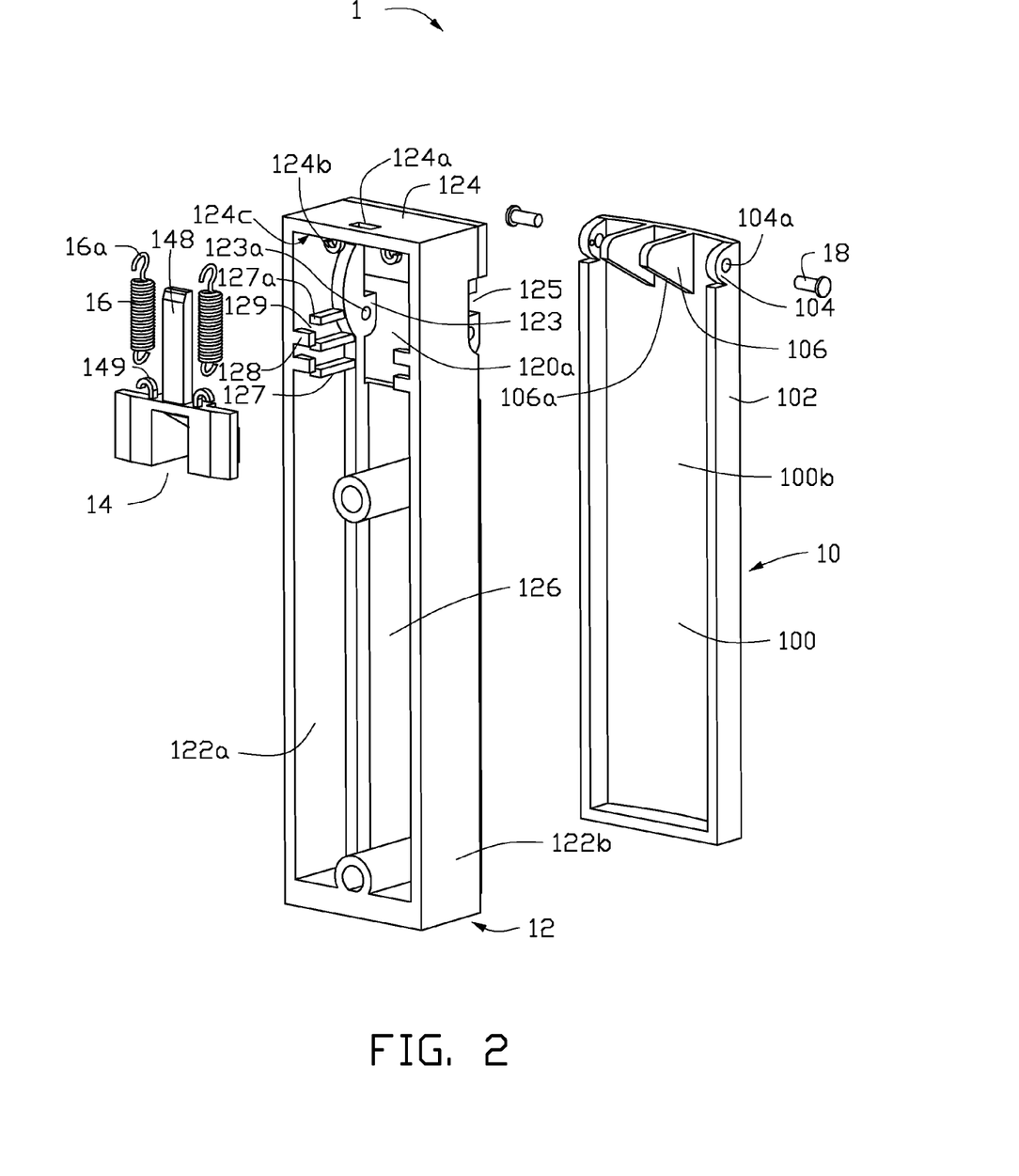
FIG. 2 is an exploded, isometric view of the locking apparatus of FIG. 1, viewed at a different angle.

Referring to FIGS. 1 and 2, a locking apparatus 1, according to an exemplary embodiment, is illustrated. The locking apparatus 1 includes a handle 10, a base 12, a slide block 14, a pair of bolts 18, and a pair of resilient elements 16.

The handle 12 is generally rectangular and includes a main body 100, a pair of substantially parallel first sidewalls 102, a pair of first connecting protrusions 104, and a pair of pressing protrusions 106. The main body 100 is a substantially rectangular plate and includes a first outer surface 100a, and a first inner surface 100b opposite to the first outer surface 100a. Each of the first sidewalls 102 is perpendicularly connected to two opposite sides of the first inner surface 100b. Each of the first connecting protrusions 104 is semi-circular and perpendicularly extends outwards from the first inner surface 100b at one distal end of each first sidewall 102. Each first connecting protrusion 104 defines a first connecting through hole 104a generally at the center thereof. Each of the pressing protrusions 106 is generally triangular and extends outwards from the first inner surface 100b between the first connecting protrusions 106. Each pressing protrusion 106 includes a first sloping surface 106a extending obliquely from the first inner surface 100b at a first predetermined angle.

The base 12 is a substantially rectangular case and includes a front cover 120, a pair of substantially parallel second sidewalls 122, and a top cover 124. The top cover 124 is a substantially rectangular plate. Each of the second sidewalls 122 is perpendicularly connected to two opposite sides of the top cover 124. Two opposite ends of each second sidewall 122 and two opposite ends of the top cover 124 are coplanar. The front cover 120 is perpendicularly connected to the coplanar ends of the second sidewalls 122 and the top cover 124. The front cover 120, the top cover 124, and the second sidewalls 122 cooperatively define a receiving space 126 to accommodate the slide block 14.

The front cover 120 defines a pressing through hole 120a near the top cover 124. Each of the second sidewalls 122 includes a second inner surface 122a, a second outer surface 122b opposite to the second inner surface 122a, a pair of second connecting protrusions 123, a number of first positioning protrusions 127, and a number of second positioning protrusions 128. Each second connecting protrusion 123 extends outwards from the end of a corresponding second sidewall 122 adjacent to the front cover 120 via the pressing through hole 120a. The second connecting protrusions 123 extend towards along a direction perpendicular to the front cover 120. The distance between the second connecting protrusions 123 is slightly shorter than the distance between the first connecting protrusions 104. Each of the second connecting protrusion 123 defines a second connecting through hole 123a generally at the center thereof. The second outer surface 122b of each second sidewall 122 defines a connecting cutout 125 corresponding to each second connecting protrusion 123.

The first positioning protrusions 127 extend perpendicularly upwards from each second inner surface 122a generally at a position corresponding to the pressing through hole 120a. The first positioning protrusions 127 are elongate plates that are substantially parallel with each other and the top cover 124. Each of the first positioning protrusions 127 includes a distal end 127a away from the front cover 120. The distal ends 127a of the first positioning protrusions 127 are coplanar. The second positioning protrusions 128 extend perpendicularly upwards from the second inner surface 122a at the end of second sidewall 122 away from the front cover 120. The second positioning protrusions 128 are elongate plates that are substantially parallel with each other and the top cover 124. In this embodiment, three first positioning protrusions 127 and two second positioning protrusions 128 are employed. Each second positioning protrusion 128 is positioned between two adjacent first positioning protrusions 128. Each second positioning protrusion 128 and the corresponding two first positioning protrusions 127 cooperatively define a guiding gap 129 between the aligned distal ends 127a of the first positioning protrusions 127 and the second positioning protrusions 128.

The top cover 124 includes a third inner surface 124c and a pair of first hooks 124b. The top cover 124 defines a tongue through hole 124a generally at the center of the third inner surface 124c. The first hooks 124b perpendicularly extend downwards from the third inner surface 124c correspondingly at two opposite sides of the tongue through hole 124a.

The slide block 14 includes a pair of substantially parallel third sidewalls 140, an upper block 142, a sloping sidewall 144, a pair of guiding ears 146, a locking tongue 148, and a pair of second hooks 149. Each of third sidewalls 140 is perpendicularly connected to the upper block 142. The sloping sidewall 144 is perpendicularly connected to each third sidewall 140. Also, the sloping sidewall 144 is obliquely connected to the upper block 142 at a second predetermined angle equal to the first predetermined angle and includes a second sloping surface 144a.

Each of the third sidewalls 140 includes a fourth outer surface 140a. The guiding ears 146 perpendicularly extend outward from the fourth outer surface 140a. The upper block 142 is generally rectangular and includes an upper surface 142a. The locking tongue 148 is an elongate plate that perpendicularly extends outwards from the upper surface 142a.

The second hooks 149 perpendicularly extend upwards from the upper surface 142a correspondingly at two opposite sides of the locking tongue 148.

Each of the resilient elements 16 includes two clasps 16a on opposite sides of the resilient element 16. In this embodiment, the resilient elements 16 are a pair of springs.

Figure 3:
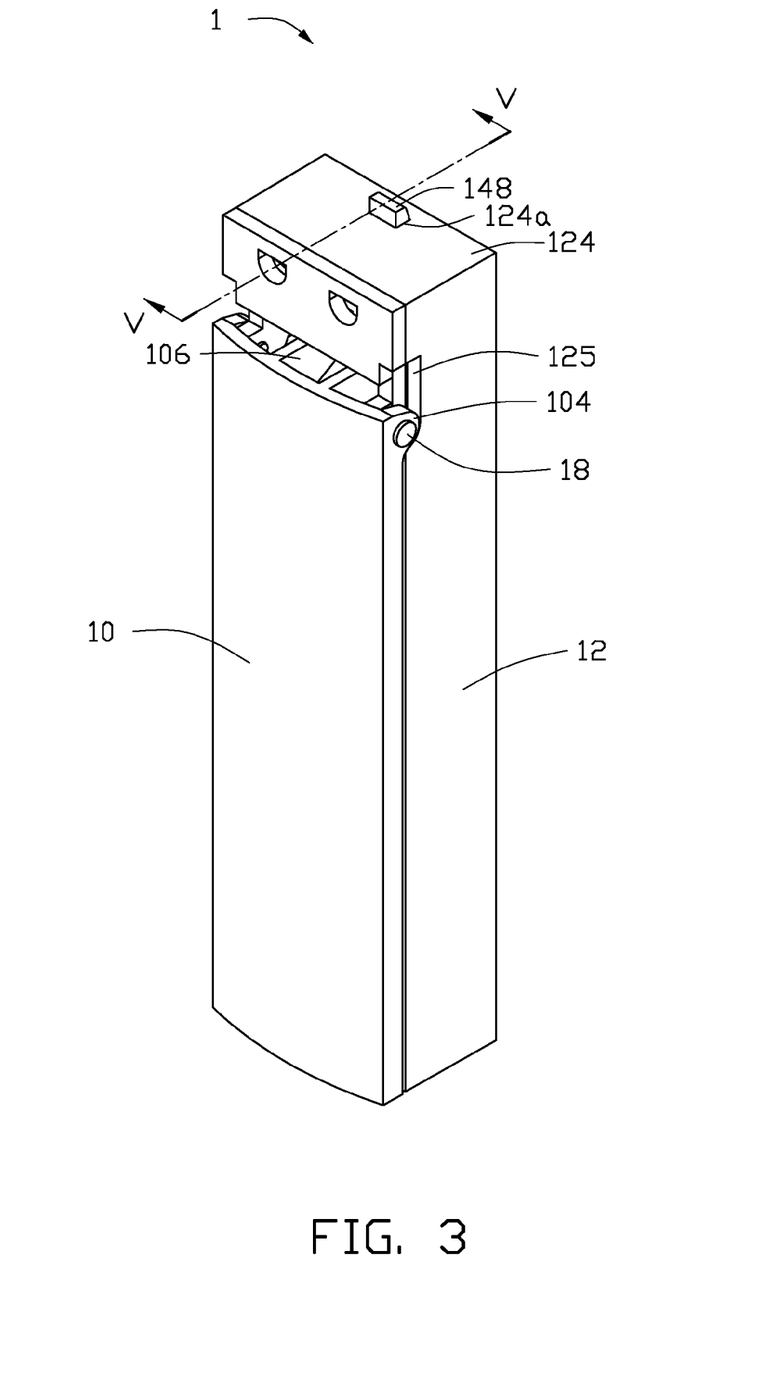
FIG. 3 is an assembled, isometric view of the locking apparatus of FIG. 1.
Figure 4:
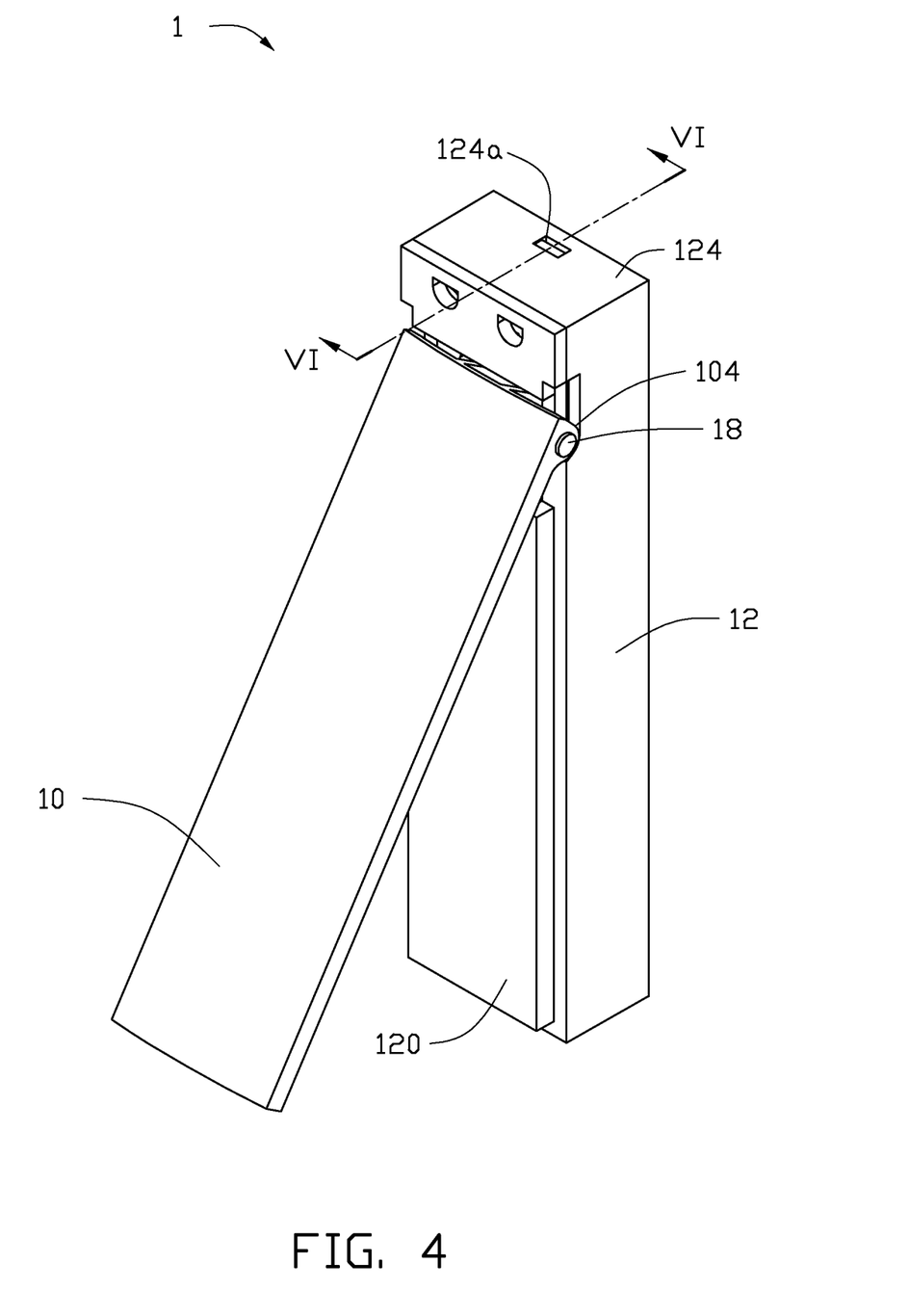
FIG. 4 is an assembled, isometric view of the locking apparatus of FIG. 1, similar to FIG. 3, when a handle is pulled away.

Also referring to FIGS. 3 and 4, in assembly, the pressing protrusions 106 insert into the receiving space 126 via passing through the pressing through hole 120a. The pressing protrusions 106 engage with the slide block 14 via the engagement between the first sloping surface 106a and the second sloping surface 144a. The first connecting protrusions 104 are correspondingly accommodated in the connecting cutouts 125. The first connecting through holes 104a are correspondingly aligned with the second connecting through holes 123a. The handle 10 is pivotally connected to the base 12 via the bolts 18 correspondingly passing through the first connecting through holes 104a and the second connecting through holes 123a.

The slide block 14 is slidablely received in the receiving space 126 via two opposite ends 16a of each resilient element 16 correspondingly connecting to the first hook 124b and the second hooks 149. The guiding ears 146 are correspondingly positioned in the guiding gaps 129.

Figure 5:
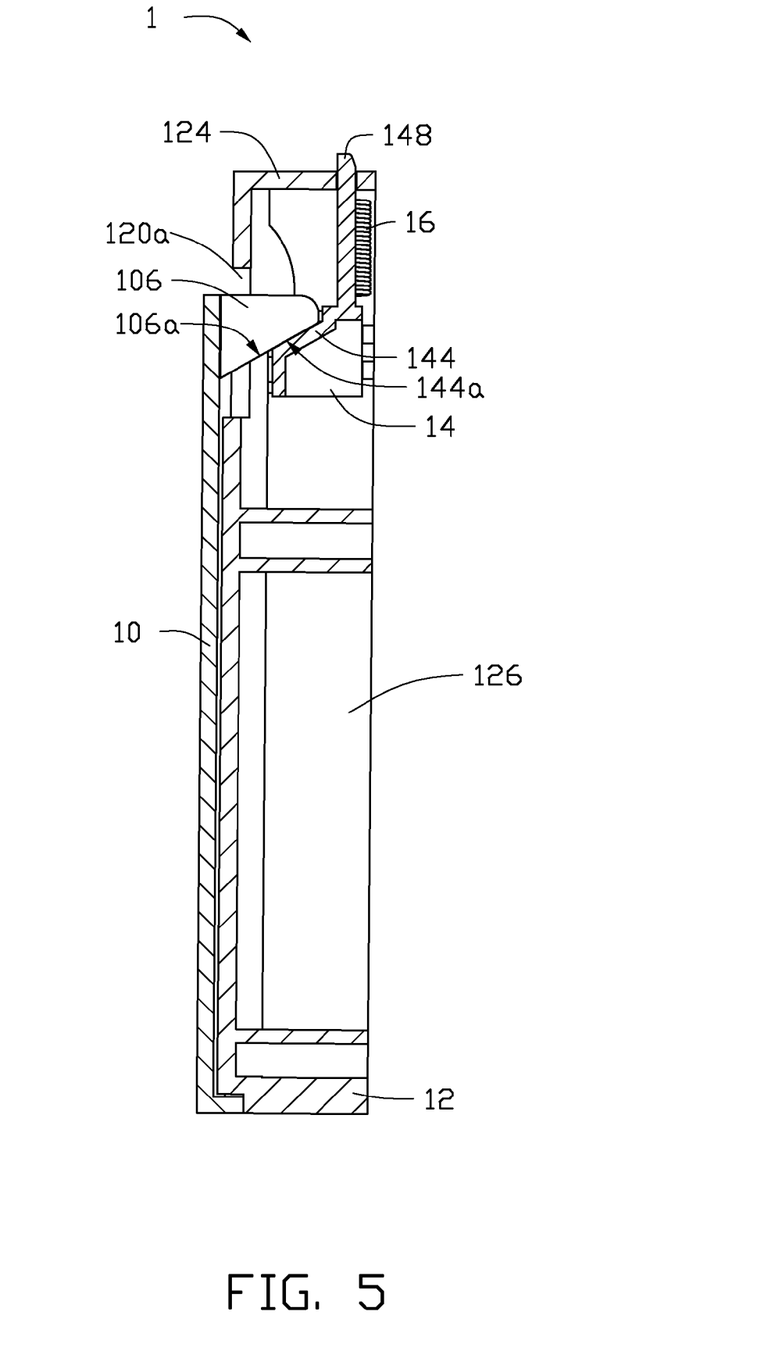
FIG. 5 is cross-section, isometric view taken along line V-V of FIG. 3.
Figure 6:
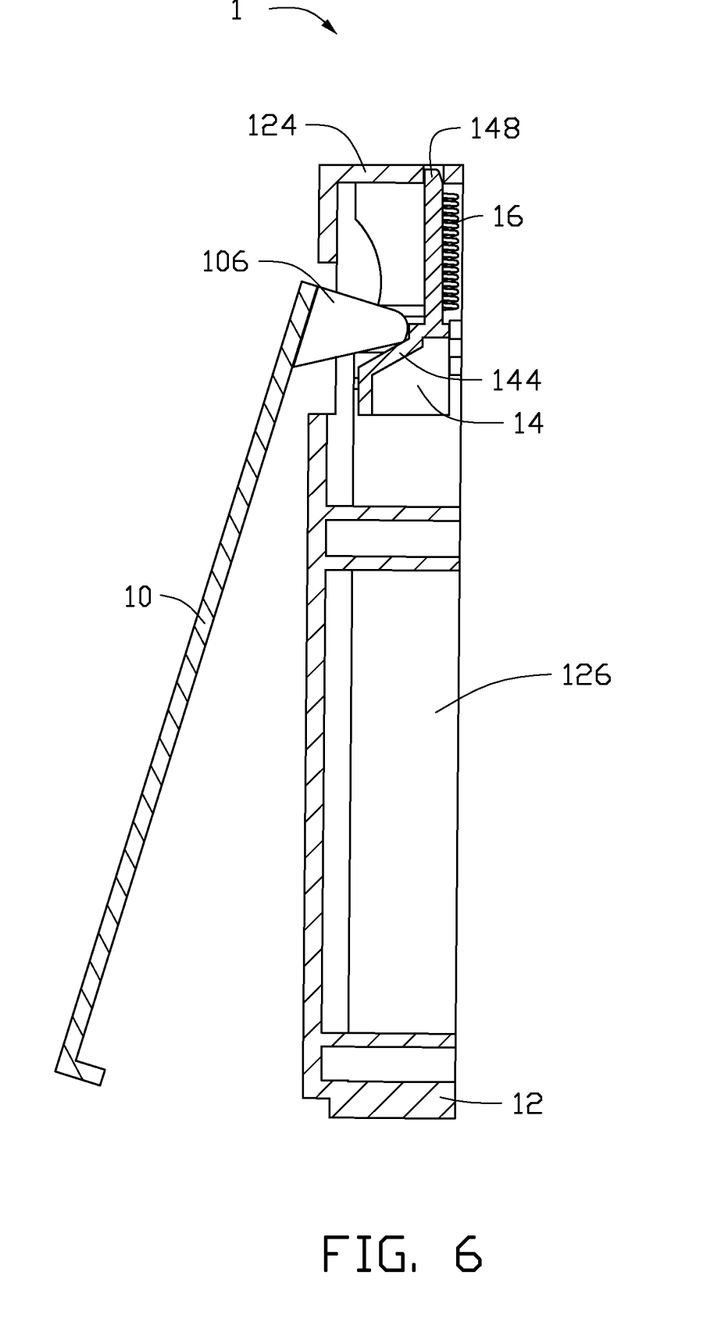
FIG. 6 is cross-section, isometric view taken along line VI-VI of FIG. 4.

Also referring to FIGS. 5 and 6, in use, the base 12 is fixed to an electronic device (not shown). The locking tongue 148 protrudes out of the receiving space 126 through the tongue through hole 124a to lock a hard disk, by inserting the locking tongue into a corresponding hole of the hard disk, when the handle 10 is close to the front cover 120 and the first sloping surface 106a of the pressing protrusion 106 contacts with the second sloping surface 144a of the slide block 14.

To unlock the hard disk, the handle 10 is pivoted away from the front cover 120. The pressing protrusions 106 push against the second sloping surface 144a downwards. The slide block 14 is moved downwards via the guiding ears 146 sliding in the guiding gaps 129. Thus, the locking tongue 148 is retracted into the receiving space 126 to unlock the hard disk from the electronic device.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A locking apparatus, comprising:
    a handle comprising a plurality of pressing protrusions;
    a base comprising a front cover, a pair of substantially parallel base sidewalls perpendicularly connected to two opposite sides of the front cover, a top cover perpendicularly connected to coplanar ends of the front cover and the base sidewalls to define a receiving space, a pressing through hole in the front cover, and a tongue through hole in the top cover in communication with the receiving space, wherein each base sidewall comprises a plurality of first positioning protrusions received in the receiving space and a plurality of second positioning protrusions received in the receiving space, the first positioning protrusions extend inwards perpendicularly from a first inner surface of the base sidewall at a position directly opposite and near the pressing through hole, the second positioning protrusions extend inwards perpendicularly from the first inner surface of the base sidewall at a position directly opposite but away from the pressing through hole, and each of the base sidewalls defines a guiding gap between the second positioning protrusions and the first positioning protrusions of said each of the base sidewalls; and
    a slide block slidably received in the receiving space through a pair of resilient elements, wherein the slide block comprises a locking tongue and a pair of guiding ears formed at two opposite sides of the locking tongue, each of the guiding ears is slidably positioned in the guiding gap of a respective one of the base sidewalls, the handle is pivotally connected to the base, the pressing protrusion protrudes into the receiving space through the pressing through hole, the handle pushes the slide block to slide via the pressing protrusions engaging with the slide block, and the locking tongue protrudes out of the base or retracts back into the base according to the movement of the slide block.

2. The locking apparatus as claimed in claim 1, wherein the handle is generally rectangular and comprises a main body, a pair of substantially parallel handle sidewalls, and a pair of first connecting protrusions, the main body comprises a first outer surface and a second inner surface, the handle sidewalls are perpendicularly connected to two opposite sides of the second inner surface, each of the first connecting protrusions extends outwards generally perpendicularly from the second inner surface at a distal end of each handle sidewall, each first connecting protrusion defines a first connecting through hole at the center, and each of the pressing protrusions extends from the second inner surface between the first connecting protrusions.

3. The locking apparatus as claimed in claim 2, wherein each of the base sidewalls further comprises a second outer surface opposite to the first inner surface.

4. The locking apparatus as claimed in claim 3, wherein each of the base sidewalls further comprises a pair of second connecting protrusions, each second connecting protrusion extends outwards from the end of a corresponding base sidewall adjacent to the front cover via the pressing through hole, each second connecting protrusion defines a second connecting through hole at the center, the distance between the second connecting protrusions is slightly shorter than the distance between the first connecting protrusions, the second outer surface of each base sidewall defines a connecting cutout corresponding to each second connecting protrusion, the first connecting protrusions are correspondingly accommodated in the connecting cutouts, the first connecting through holes are correspondingly aligned with the second connecting through holes, and the handle is pivotally connected to the base via a pair of bolts correspondingly passing through the first and second through holes.

5. The locking apparatus as claimed in claim 3, wherein the slide block further comprises a pair of substantially parallel slide sidewalls, an upper block, and a sloping sidewall, each of the slide sidewalls is perpendicularly connected to the upper block, and the sloping sidewall is perpendicularly connected to each slide sidewall and obliquely connected to the upper block.

6. The locking apparatus as claimed in claim 5, wherein the upper block comprises an upper surface, the locking tongue extends outwards perpendicularly from the upper surface, the top cover comprises a third inner surface, the tongue through hole is defined generally at the center of the third inner surface, and the locking tongue protrudes out of the base through the tongue through hole.

7. The locking apparatus as claimed in claim 6, wherein the upper block further comprises a pair of second hooks extending upwards perpendicularly from the upper surface correspondingly at two opposite sides of the locking tongue, the top cover further comprises a pair of first hooks extending downwards perpendicularly from the third inner surface correspondingly at two opposite sides of the tongue hole, each of the resilient elements comprises two opposite ends, and the slide block is slidably received in the receiving space via two opposite ends of each resilient element correspondingly connecting to the first hooks and the second hooks.

8. The locking apparatus as claimed in claim 6, wherein the first positioning protrusions of each base sidewall are elongate plates that are substantially parallel with each other and the top cover, and the ends of the first positioning protrusions adjacent to the second positioning protrusions are coplanar with each other.

9. The locking apparatus as claimed in claim 8, wherein each of the slide sidewalls comprises a third outer surface, and the guiding ears extend outwards perpendicularly from the third outer surface.

10. The locking apparatus as claimed in claim 5, wherein each pressing protrusion comprises a first sloping surface extending obliquely from the second inner surface at a first predetermined angle, the sloping sidewall comprises a second sloping surface extending obliquely from the upper block at a second predetermined angle, the first predetermined angle is equal to the second predetermined angle, and the pressing protrusions engage with the slide block via contact between the first sloping surfaces and the second sloping surface.

11. The locking apparatus as claimed in claim 1, wherein each of the guiding ears is slidably positioned only in the guiding gap of the respective base sidewall and is not positioned in the guiding gap of the other base sidewall.

12. A locking apparatus, comprising:
 a handle comprising a main body and at least one pressing protrusion extending from an inner surface of the main body;
 a base comprising a front cover, a pair of opposite base sidewalls perpendicularly connected to opposite sides of the front cover, and a top cover perpendicularly connected to coplanar ends of the front cover and the base sidewalls, a cooperation of the front cover, the base sidewalls and the top cover defining a receiving space, the top cover defining a tongue through hole communicating with the receiving space, the front cover defining a pressing through hole communicating with the receiving space, each one of the pair of opposite base sidewalls forming at least one first positioning protrusion in the receiving space and at least one second positioning protrusion in the receiving space, wherein the at least one second positioning protrusion extends from a rear side of each base sidewall away from the front plate, the at least one second positioning protrusion on each base sidewall is spaced from the at least one first positioning protrusion on the same base sidewall by a guiding gap, and both the at least one first positioning protrusion and the at least one second positioning protrusion are located right behind the pressing through hole; and
 a slide block slidably received in the receiving space through a pair of resilient elements, the slide block comprising a locking tongue and a pair of guiding ears respectively formed on opposite sides of the locking tongue;
wherein, the guiding ears are slidably positioned in the guiding gaps, respectively, each guiding ear is limited by the at least one first positioning protrusion and the at least one second positioning protrusion of the respective base sidewall, the handle is pivotally connected to the base, the pressing protrusion protrudes into the receiving space through the pressing through hole and engages with the slide block to push the slide block to move when the handle rotates, and the locking tongue protrudes out of the base or retracts back into the base according to the movement of the slide block.

* * * * *